May 9, 1939.

R. W. ROBINSON 2,157,461

COASTER

Filed June 2, 1938

R. W. Robinson
INVENTOR.

BY CASnow&Co.
ATTORNEYS.

May 9, 1939.  R. W. ROBINSON  2,157,461
COASTER
Filed June 2, 1938  3 Sheets-Sheet 3

R. W. Robinson
INVENTOR.
BY C. A. Snow & Co.
ATTORNEYS.

Patented May 9, 1939

2,157,461

UNITED STATES PATENT OFFICE 2,157,461

COASTER

Raleigh W. Robinson, Galesburg, Ill.

Application June 2, 1938, Serial No. 211,442

5 Claims. (Cl. 280—8)

This invention relates to a coaster, an object being to provide a device of this character which can be used either as a wheel-supported vehicle or as a runner-supported conveyance, according to the conditions under which it is to be employed.

A further object is to provide the device with quickly demountable running gear including supporting wheels, it being possible to remove this running gear whenever it is desired to use the coaster as a sled or to readily place the running gear in position when the vehicle is to be used as a wagon or wheel-supported coaster.

A further object is to provide a novel means for connecting the front wheels to the structure, said connection including steering mechanism.

With the foregoing and other objects in view which will appear as the description proceeds, the invention consists of certain novel details of construction and combinations of parts herein-after more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
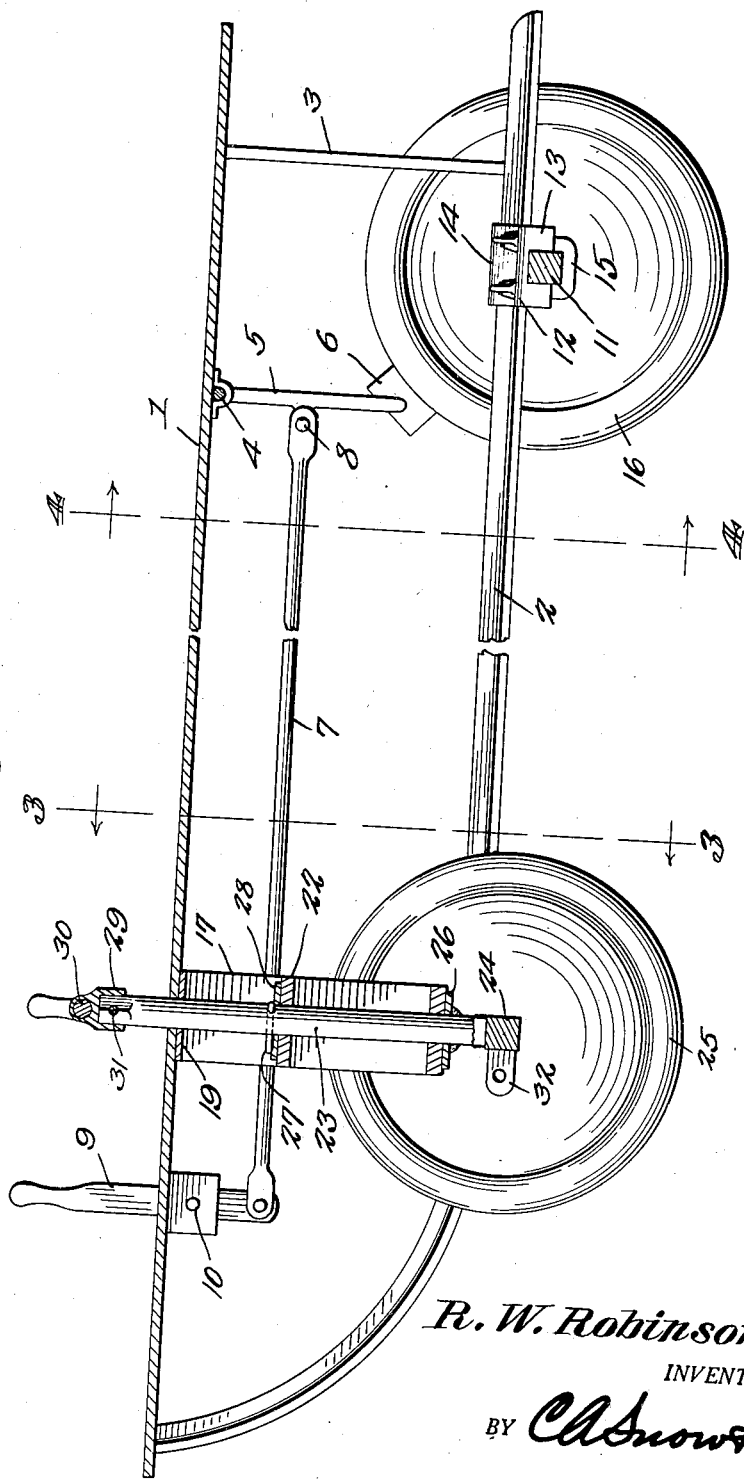
Figure 1 is a vertical longitudinal section through the device.
Figure 2:
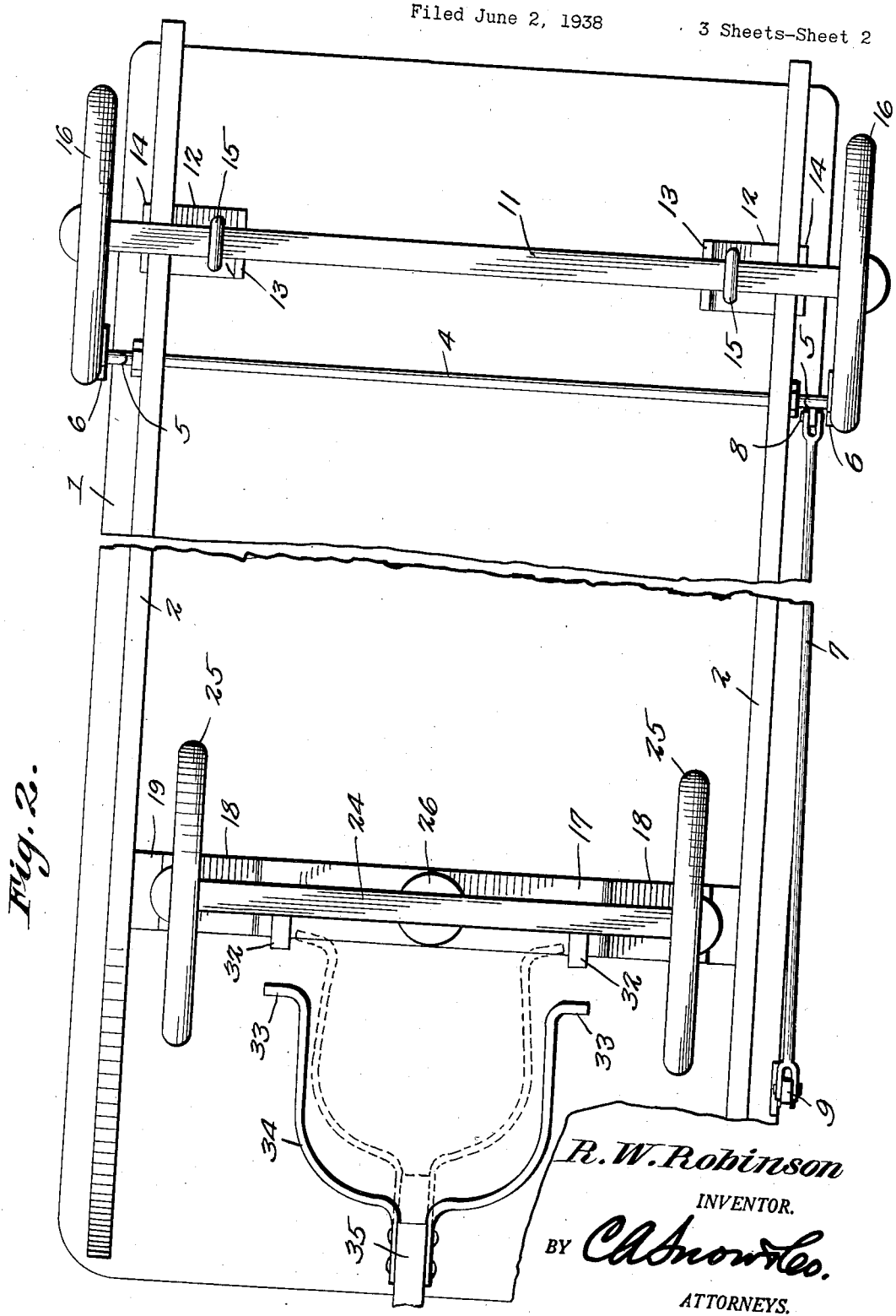
Figure 2 is a bottom plan view thereon, portions being broken away.
Figure 3:
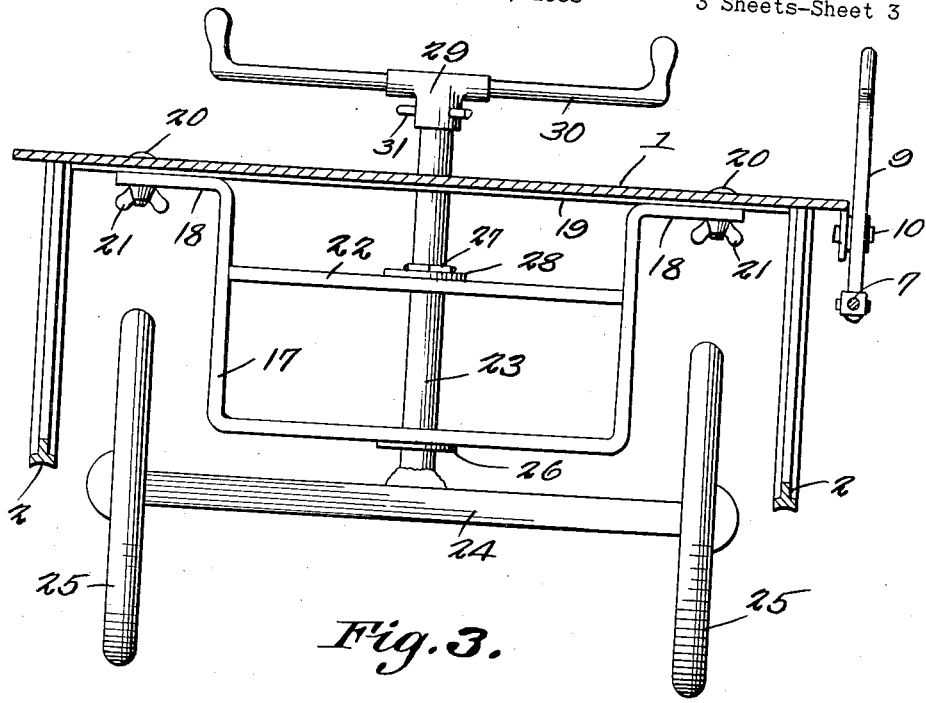
Figure 3 is a section on line 3—3, Figure 1.
Figure 4:
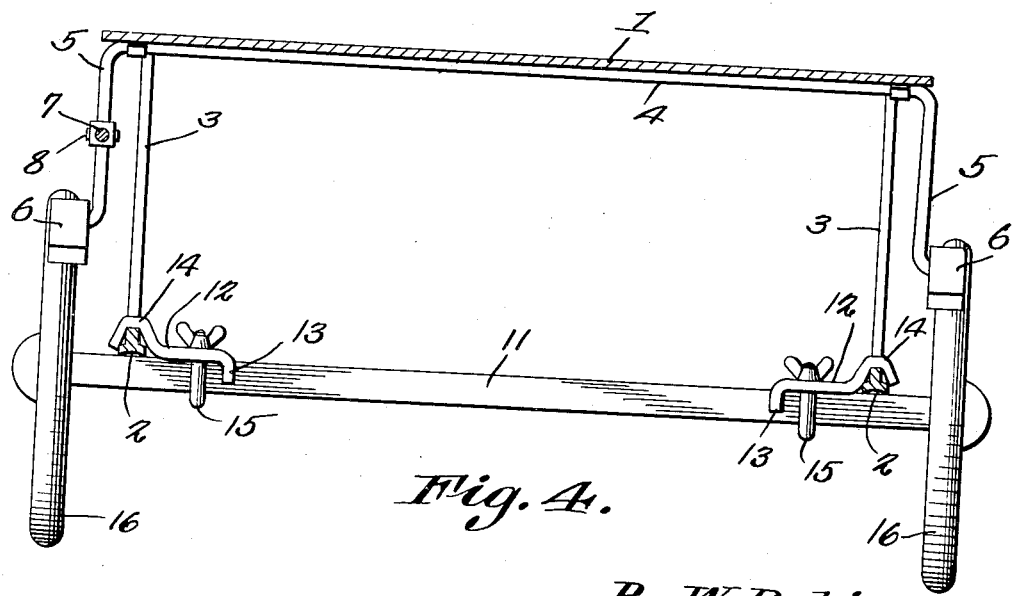
Figure 4 is a section on line 4—4, Figure 1.

Referring to the figures by characters of reference 1 designates the body of the coaster which can be of wood or metal, as preferred, and suitably secured to the body adjacent to the front and back ends thereof are sled runners 2 the forward ends of which are upwardly curved and joined directly to the forward portion of the body while the rear portions may be joined to the body by struts 3 or other suitable connecting means.

The body is provided, near the back portion thereof, with a transverse shaft 4 extending thereunder and joined thereto, this shaft being provided with depending arms 5 each of which carries at its lower end a brake shoe 6. An operating rod 7 is pivotally connected to one of the arms 5 as shown at 8 and the forward end of this rod is pivotally joined to the lower end of a brake lever 9 which extends through the body and is pivotally connected thereto at an intermediate point as shown at 10.

A transverse rear axle 11 is extended under the rear portions of the runners 2 and supports coupling plates 12 each of which has a downturned forked end 13 adapted to straddle the axle while the other end of each coupling plate is offset upwardly and bent to form an inverted yoke 14 so proportioned as to straddle one of the runners 2 resting on the axle 11. By means of a U-bolt 15 which extends through each plate 12, the plate is bound securely onto the axle and also onto the engaged runner so that the runner and axle thus are joined securely together but can be readily disconnected.

A supporting wheel 16 is mounted on each end of the axle and both of these wheels are located where they can be engaged by the brake shoes 6 when lever 9 is shifted in one direction.

A depending frame 17 formed preferably of a flat metal strip, is located under the forward portion of the body 1 and extends transversely thereof, the sides of this frame being formed with outturned oppositely extending arms 18. These arms bear against a transverse stiffening strip 19 on the bottom surface of the body 1 and are detachably secured to said strip and to the body by bolts 20 having wing nuts 21 or the like on the lower ends thereof.

A cross bar 22 connects the sides of the frame and mounted for rotation therein is a spindle 23 fixedly joined to and extending upwardly from the middle portion of the front axle 24 which is supported by the front wheels 25 of the structure. A collar 26 on the spindle is located under the bottom of frame 17 so as to limit the downward movement of said frame on the spindle. A pin 27 engages the spindle above cross bar 22 and bears on a washer 28 which is interposed between the pin and said bar. Thus the spindle 23, while free to rotate in frame 17 and bar 22, is held against longitudinal movement relative thereto.

The upper portion of the spindle 23 is extended through an opening in the body 1 and engages in a sleeve 29 depending from the middle portion of a handle bar 30. This sleeve is joined to the spindle by a removable transverse pin 31.

It will be obvious that when the coaster is to be used with its wheel support, the parts will be assembled as shown in the drawings and the coaster can readily be steered by means of the handle bars 30 which, when shifted, will cause spindle 23 to rotate back and forth and produce a corresponding movement of the axle 24.

Should it be desired to use this device without the wheels so that it can be supported by the runners 2, it would be necessary only to remove pin 31 and lift the handle bar sleeve 29 off of spindle 23. The nut 21 should then be removed whereupon the frame 17 and the spindle can be withdrawn downwardly from the body 1. The U-bolts 15 are then loosened relative to the coupling plates 12 so that the yokes 14 can be freed from engagement with the runners 2 and the rear axle 11 with its wheels, removed from under the body 1. With these parts taken off the runners can engage the supporting surface and the coaster can then be used as a sled.

It is preferred to extend a pair of ears 32 forwardly from axle 24 at opposite sides of the axis of movement thereof and these ears can be detachably engaged by the oppositely extended fingers 33 of a yoke 34 located at one end of a tongue 35. This tongue thus can be employed for pulling the coaster when used as a wheel-supported vehicle.

What is claimed is:

1. A coaster including a body, runners rigidly connected thereto, a wheel-supported axle detachably connected to and extending under the runner, a frame beneath and detachably connected to the body between the runners, a spindle mounted for rotation in the frame and extending through the body, a front axle fixedly connected to and movable with the spindle, supporting wheels engaging the axle, and a handle bar detachably mounted on the spindle for holding it against withdrawal from the body.

2. A device of the class described including a body, runners fixedly connected thereto, a rear wheel-supported axle detachably secured to and extending under the runners, a frame beneath the body and having oppositely extending terminals, means for detachably securing said terminals to the body, a spindle mounted for rotation within the body and frame, an axle connected to and rotatable with the spindle, means for holding said spindle against withdrawal from the frame, a handle bar connected to the upper end of the spindle for holding it against withdrawal from the body, and supporting wheels engaging the front axle.

3. A device of the class described including a body, runners fixedly connected thereto, a wheel-supported rear axle connected to the runners in combination with a front wheel unit for supporting the body, said unit including a frame having outturned upper terminals, a cross bar, a spindle mounted for rotation in the frame and cross bar for insertion upwardly through the body, means for detachably joining said terminals to the body, a handle bar mounted on a spindle for holding it against withdrawal from the body, means for detachably holding the handle bar to the spindle, and a wheel supported axle joined to and movable with the spindle.

4. A device of the class described including a body, runners fixedly connected thereto, a wheel-supported rear axle connected to the runners in combination with a front wheel unit for supporting the body, said unit including a frame having outturned upper terminals, a cross bar, a spindle mounted for rotation in the frame and cross bar for insertion upwardly through the body, means for detachably joining said terminals to the body, a handle bar mounted on a spindle for holding it against withdrawal from the body, means for detachably holding the handle bar to the spindle, and a wheel supported axle joined to and movable with the spindle, and means on the spindle cooperating with the frame and cross bar for holding said spindle against longitudinal movement.

5. A device of the class described including a body, runners fixedly connected thereto, a front wheel unit detachably connected to the body including a spindle extending through the body, a handle bar detachably mounted on the spindle for holding it against withdrawal from the body, and a wheel-supported axle movable with the spindle, and a rear wheel unit including an axle extending under the runners, wheels thereon, coupling plates straddling the axle and runners, and means embracing the axle and engaging the plates for binding them upon the axle and runners.

RALEIGH W. ROBINSON.